Aug. 6, 1940.　　　　F. SPILL　　　　2,210,507
EYEGLASSES
Filed Feb. 21, 1938
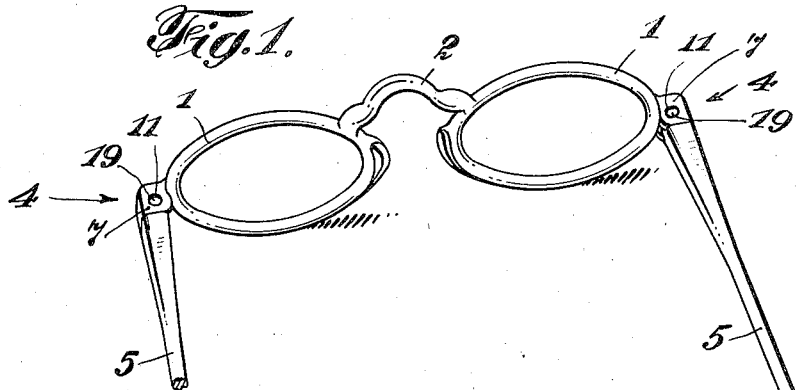
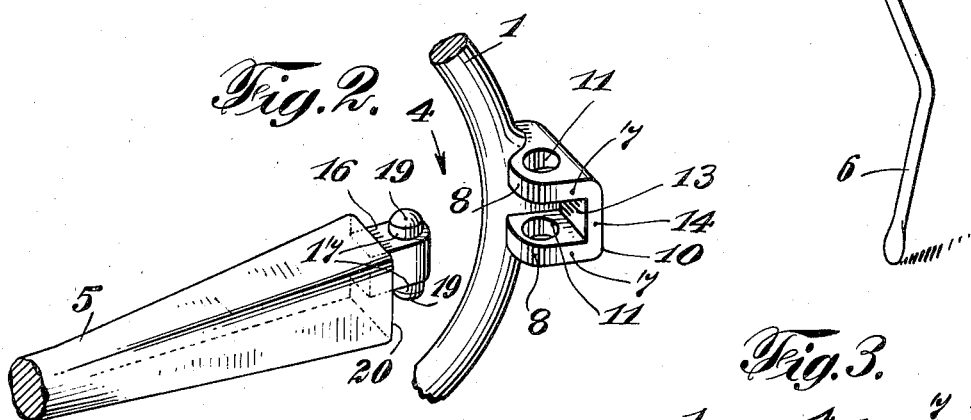
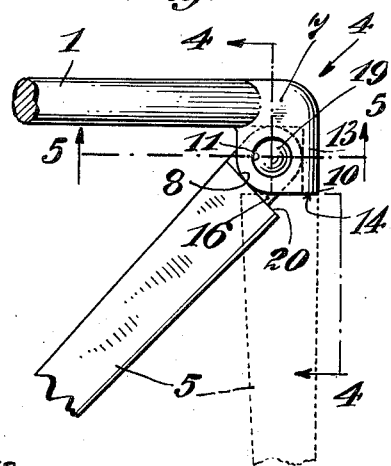
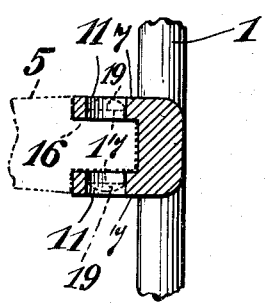
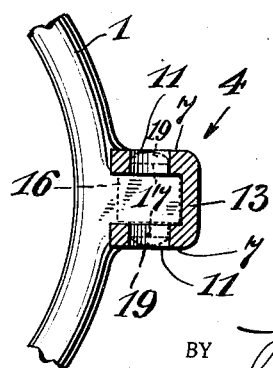
INVENTOR.
Fred Spill
BY Norman A. Holland
his ATTORNEY.

UNITED STATES PATENT OFFICE 2,210,507

EYEGLASSES

Fred Spill, East Rutherford, N. J., assignor to Spill Manufacturing Co., Inc., East Rutherford, N. J., a corporation of New Jersey Application February 21, 1938, Serial No. 191,705

5 Claims. (Cl. 88—53)

The present invention relates to eyeglasses of the sun glass type, and more particularly to an improved hinge or pivot construction for retaining the temples to the frames.

Sun glasses have gone into extensive use where intense light is discomforting to the eyes, and particularly in driving cars, at beaches, when taking sun baths, and for winter sports. By utilizing mass production methods, the cost thereof has been consistently reduced until today glasses, comparable to those sold heretofore at twenty-five cents a pair, are now being sold in chain store syndicates for as little as ten cents, of which the manufacturer receives about six or seven cents. It will be appreciated, therefore, that in order to sell a pair of lenses, a pair of temples, and a frame assembled together for as little as six or seven cents, all unnecessary operations and costs must be eliminated. In view of the fact that sun glasses are purchased by central agencies which purchase for a large number of stores, they may be purchased in thousand gross lots. Such large purchases are of course more profitable to manufacturers who can make longer runs of their equipment. However, with such a purchase, a difference in selling price of as much as ten cents a gross or about one-fifteenth of a cent an item, is sufficient to give one manufacturer a substantial advantage over another. Moreover, chain stores make elaborate tests on items of this character and require that they be of a high quality with ruggedness and strength adequate to sustain the most severe usage likely to be encountered. The hinging of the frame and the temples together is an expensive operation in the manufacture of sun glasses since it requires considerable time. In addition, it is one of the weakest parts of the articles and is subjected to the most severe strains. In making some types of hinge constructions, small metal objects have to be handled and inserted into apertures which increases the number of parts, the labor required to assemble them, and the cost of the articles. In other cases, weak and unsatisfactory connections are resorted to in an effort to reduce costs.

The present invention is directed more particularly to the hinge construction of sun glasses and aims to attain the objects and overcome the difficulties above mentioned by providing a joint construction for retaining the side members to the frame which is simple, inexpensive to manufacture and thoroughly practical. It aims to provide a structure which may be quickly assembled, which requires no parts other than the side members and frames themselves, and which is attractive in appearance.

An object of the present invention is to provide an inexpensive and practical hinge construction for sun glasses and the like.

Another object of the invention is to provide a hinge construction requiring a minimum number of parts.

Another object of the invention is to provide a hinge structure which effectively joins the side pieces to the frame and which will not readily come apart.

Another object of the invention is to provide a sun glass construction which may be easily and quickly assembled.

A further object of the invention is to provide a sun glass construction which may be assembled with a minimum amount of effort and skill.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein Fig. 1 is a perspective view of a frame with the temples or side members assembled therewith;

Fig. 2 is an enlarged fragmentary view of one of the hinges shown in Fig. 1 prior to the assembly of the parts;

Fig. 3 is a plan view of one of the hinges of Fig. 1;

Fig. 4 is an enlarged sectional view taken along line 4—4 of Fig. 3; and

Fig. 5 is an enlarged sectional view taken along line 5—5 of Fig. 3.

Referring again to the drawing, there is shown a pair of sun glasses comprising lens retaining portions 1 connected by a bridge or nose portion 2, and having hinges or joints 4 at the sides to cooperate in securing side members 5 to the frame. The side members or temples 5 extend rearwardly and terminate in a curved portion 6 adapted to extend behind the ears of a user to hold the glasses in position. In the following description, the side members will be referred to for convenience as temples.

The frame and temples are preferably made of a moldable material such as cellulose acetate and are molded several pairs at a time in the same mold, that is, the requisite number of temples are molded simultaneously with each of a number of frames. Upon removal of the parts from a mold, any projections or gates caused by the molding operation may be removed. The resulting parts are smooth throughout and quite strong, and their molding cost is quite low due to method and multiple frame molds used.

An expensive operation is to hinge the temples to the frame and the present invention pertains more particularly to this feature. In Fig. 2 an enlarged view from the rear of the frame shows the receiving part 4 of a hinge molded integrally with the frame at the side thereof. A similar construction is used at each side of the frame and a description of one will suffice for both.

The socket or receiving part of the hinge, which is a part of the frame, comprises a pair of outwardly extending flanges or horizontal portions 7 spaced vertically from each other, having rounded portions 8 at the inner corners thereof and terminating in comparatively abrupt outer corners 10. Holes 11 are provided adjacent to the inner rounded corners of the flanges. These holes are preferably drilled through the flanges after the frames are removed from the molds. In order to strengthen the flanges, they may be connected at the front and sides by a vertical portion or wall 13 which is rounded at the front corner thereof to improve its appearance and facilitate molding. The rearward edge of this wall preferably terminates at the same point as the outer corners of the upper and lower horizontal flanges, and forms with them a stop face 14, the purpose of which will be hereinafter described.

The cooperating part of the hinge structure is provided at the forward end of the temple member which retains the glasses in position on the wearer, and is preferably molded integrally with the temple. It comprises a reduced portion 16 extending outwardly from the inner side of the end of the temple member having projections or lugs 17 thereon. The projections 17 preferably have rounded ends 19 and extend out from the upper and lower surface of the forwardly extending part a distance approximately equal to the height of the unreduced forward end of the temple member. A vertical stop face 20 is provided at the outer side of the end of the temple member.

In assembling the temples with the frame, the projections on the reduced portion at the forward end of the temple may be easily and quickly snapped into the apertures of the horizontal portions 7 at the sides of the frame as indicated in Fig. 2. In assembled relation, the reduced portion 16 on the temple extends within the socket on the frame with the upper and lower faces thereof forming, in effect, bearing surfaces. The projections 17 on the portion 16 fit into the holes 11 in the upper and lower flanges 7 of the socket to effectively retain the temple on the frame. Preferably, the lugs 17 extend substantially to the upper and lower outer surfaces of the flanges (Figs. 4 and 5) to provide smooth surfaces and a positive lock which will not come apart even under rough usage.

In operation, the rounded corners 8 of the flanges permit folding of the temples against the frame so that the glasses may be carried about in flattened position in the vest pocket. As the temples are swung outwardly toward open position, another important feature of the hinge construction appears. This is in connection with the stop faces 14 of the socket and 20 at the outer side of the end of the temple member. As a temple moves outwardly, the stop face 20 thereon approaches the stop face 14 on the frame (Fig. 3) until when the temple is substantially perpendicular to the frame, both the stop faces are in contact and cooperate to prevent further outward movement of the temple member.

This feature is particularly desirable for if the stop is not provided, the temples will not be held close to the head and behind the ears of the user, but instead will swing outwardly too far and allow the glasses to fall and break. By varying the angles of the cooperating stop faces, the amount of outward swing of the temples can be regulated. That is, the temples can be caused to swing outwardly at an angle greater or less than perpendicular to the frame and the force with which they grip the head of a wearer can thus be regulated.

It will be seen that the present invention provides an improved inexpensive hinge construction for sun glasses which requires a minimum number of parts. The hinge is sturdy, effectively locks the temples to the frame, and will not come apart even under rough usage. The glasses may be quickly and easily assembled with a substantial saving in time and with a minimum amount of effort and skill. An operator may be quickly trained to assemble the temples and frames at a rapid rate because the operation reduces itself to snapping the ends of the temples in place. There is no insertion and bradding of pins or other tedious and complicated operation. The labor required and the cost of the glasses are reduced. In view of their low selling price, small reductions in cost enable the manufacturer to sell at a lower price and maintain the same margin of profit. The difference of ten cents a gross in the manufacturer's price may mean the gain or loss of a large order.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a device of the class described, the combination of a frame having at one side thereof spaced outwardly extending portions provided with apertures therethrough and a substantially vertical portion connecting said outwardly extending portions adapted to assist in maintaining the spaced relation thereof, and a side member having a forwardly extending reduced portion at the end thereof provided with rounded integral projections adapted to be snapped within the apertures in said outwardly extending portions and to extend substantially to the outer surfaces thereof to secure the side member to the frame.

2. A temple member adapted to be utilized with a sun glass frame formed of a plastic molding compound provided with an outwardly extending reduced part at one end thereof in alignment with the inner side of the temple member and occupying about one-half the width thereof, a pair of round-ended projections on said outwardly extending reduced part adapted to allow snapping thereof into engagement with recesses in the hinge portion of a frame to retain the temple member to a frame, and a stop face on said temple member adjacent the outer side thereof and occupying the remaining width thereof.

3. A temple member formed of a plastic molding compound provided with an outwardly extending reduced portion at one end thereof in alignment with the inner side of the temple member and occupying approximately one-half the width thereof, and rounded projections on said reduced outwardly extending portion adjacent the end thereof adapted to permit said projections to be readily snapped into engagement with a cooperating portion on an eyeglass frame.

4. In a device of the class described, the combination of a frame and a side member assembled with the frame each made from a plastic molding compound, a hinge structure on the frame integrally formed with the frame in the same molding operation for retaining said side member to the frame comprising spaced upper and lower resilient portions having recesses therein and said resilient portions extending outwardly from a side of the frame and adapted to yield outwardly with respect to each other by reason of the resilience thereof to facilitate assembly with said side member, said side member having a reduced portion at the end thereof with integrally formed rounded-end projections thereon and said reduced end of the side member extending between the upper and lower resilient hinge portions with the integrally formed rounded-end projections snapped into engagement with the recesses in said resilient upper and lower hinge portions to retain the side member in position without requiring any elements in addition to the frame and side member.

5. In a device of the class described, the combination of a frame and a pair of side members, each part made from a plastic molding compound, hinge structures integrally formed with the frame at each side thereof in the same molding operation for retaining said side members to the frame comprising spaced upper and lower resilient portions extending outwardly from the sides of the frame and connected by end walls to assist in maintaining the normal spaced relation thereof and with apertures therethrough and adapted to yield outwardly with respect to each other by reason of the resilience thereof to facilitate assembly with said side members, each of said side members having a reduced extension at one end thereof with integrally formed round-ended projections thereon, said round-ended projections being snapped within the apertures of the upper and lower resilient hinge portions at the sides of the frame to retain the side members in position without requiring any elements other than the frame and the pair of side members.

FRED SPILL.